US011875761B2

(12) United States Patent
Lee et al.

(10) Patent No.: US 11,875,761 B2
(45) Date of Patent: Jan. 16, 2024

(54) DISPLAY DRIVING CIRCUIT AND DISPLAY DEVICE INCLUDING THE SAME

(71) Applicant: Samsung Electronics Co., Ltd., Suwon-si (KR)

(72) Inventors: Kyuchan Lee, Yongin-si (KR); Pureum Ryoo, Seoul (KR); Hyoungpyo Lee, Yongin-si (KR); Junghyun Lim, Seongnam-si (KR)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 0 days.

(21) Appl. No.: 17/941,505

(22) Filed: Sep. 9, 2022

(65) Prior Publication Data

US 2023/0083289 A1 Mar. 16, 2023

(51) Int. Cl.
*G09G 5/393* (2006.01)

(52) U.S. Cl.
CPC ..... *G09G 5/393* (2013.01); *G09G 2320/0673* (2013.01); *G09G 2340/0435* (2013.01)

(58) Field of Classification Search
CPC ........... G09G 5/393; G09G 2320/0673; G09G 2340/0435; G09G 5/18; G09G 3/2011
See application file for complete search history.

(56) References Cited

U.S. PATENT DOCUMENTS

| | | | | |
|---|---|---|---|---|
| 9,865,231 | B2 | 1/2018 | Kim et al. | |
| 10,147,370 | B2 | 12/2018 | Verbeure et al. | |
| 10,991,321 | B1 | 4/2021 | Chen et al. | |
| 2007/0097107 | A1 | 5/2007 | Furukoshi | |
| 2015/0170609 | A1* | 6/2015 | Jung | G09G 3/20 345/212 |
| 2017/0124934 | A1* | 5/2017 | Verbeure | G09G 3/3611 |
| 2020/0066215 | A1* | 2/2020 | Koo | G09G 3/3426 |
| 2020/0135146 | A1 | 4/2020 | Lee et al. | |

FOREIGN PATENT DOCUMENTS

| | | | |
|---|---|---|---|
| KR | 101651291 | B1 | 8/2016 |

* cited by examiner

*Primary Examiner* — Brent D Castiaux
(74) *Attorney, Agent, or Firm* — Harness, Dickey & Pierce, P.L.C.

(57) ABSTRACT

A display driving circuit includes a frame rate extractor configured to receive a vertical synchronization signal indicating a start of a k-th frame, k-th frame data including information about the k-th frame, and a data enable signal indicating an active period of the k-th frame and a variable blank period that occurs after the active period, and extract a frame rate of the k-th frame, based on the vertical synchronization signal; and an image corrector configured to correct frame data received after reception of the k-th frame data, based on the frame rate of the k-th frame, and output the corrected frame data as output image data, wherein the vertical synchronization signal is received before a start time point of the active period.

20 Claims, 10 Drawing Sheets

DISPLAY DRIVING CIRCUIT AND DISPLAY DEVICE INCLUDING THE SAME

CROSS-REFERENCE TO RELATED APPLICATION

This application is based on and claims priority under 35 U.S.C. § 119 to Korean Patent Application No. 10-2021-0122064, filed on Sep. 13, 2021, in the Korean Intellectual Property Office, the disclosure of which is incorporated by reference herein in its entirety.

BACKGROUND

The inventive concept relate to electronic devices, and more particularly, to display driving circuits and display devices.

A display device may display an image at a constant frame rate. However, a rendering frame rate by a host processor (e.g., a graphics card or a graphics processing unit (GPU)) that provides frame data to the display device may not match the frame rate of the display device. Tearing may occur in which a boundary line is caused in an image of the display device by the frame rate mismatch.

In order to reduce or prevent tearing, a variable frame mode, that is, a variable refresh rate (VRR) mode, may be used in which the host processor changes a blank period for each frame and provides frame data to the display device at a variable frame rate. The VRR mode may include a free-sync mode and a G-sync mode.

In the display device operating in the variable frame mode, the length of a blank period may be increased to be greater than the length of a blank period in a normal mode in which an image is displayed at the constant frame rate. When the frame rate is rapidly changed, luminance may be reduced due to a leakage current in the increased blank period, and thus, output distortion and flicker may occur.

SUMMARY

The inventive concept provide display driving circuits and display devices capable of reducing a delay until a time point of completion of frame rate extraction, and performing gamma correction and color correction on frame data according to an extracted frame rate, thereby reducing deterioration in image quality and preventing, or reducing, flicker.

According to some example embodiments of the inventive concepts, there is provided a display driving circuit including: a frame rate extractor configured to receive a vertical synchronization signal indicating a start of a k-th frame, k-th frame data including information about the k-th frame, and a data enable signal indicating an active period of the k-th frame and a variable blank period that occurs after the active period, and extract a frame rate of the k-th frame, based on the vertical synchronization signal; and an image corrector configured to correct frame data received after reception of the k-th frame data, based on the frame rate of the k-th frame, and output the corrected frame data as output image data, wherein the vertical synchronization signal is received before a start time point of the active period.

According to some example embodiments of the inventive concepts, there is provided a display driving circuit including: a frame rate extractor configured to receive a vertical synchronization signal indicating a start of each of N frames, input image data including frame data corresponding to each of the N frames, and a data enable signal indicating an active period and a variable blank period of each of the N frames, and extract a frame rate of a k-th frame (k is an integer greater than or equal to 1 and less than or equal to N); and an image corrector configured to correct, based on the frame rate of the k-th frame, (k+1)th frame data corresponding to a (k+1)th frame.

According to some example embodiments of the inventive concepts, there is provided a display device including: a display panel; a display driving circuit configured to drive the display panel such that an image is displayed on the display panel; a frame rate extractor configured to receive a vertical synchronization signal indicating a start of a k-th frame, k-th frame data including information about the k-th frame, and a data enable signal indicating an active period of the k-th frame and a variable blank period that occurs after the active period, and extract a frame rate of the k-th frame, based on the vertical synchronization signal; and an image corrector configured to correct frame data received after reception of the k-th frame data, based on the frame rate of the k-th frame, and output the corrected frame data as output image data, wherein the vertical synchronization signal is received before a start time point of the active period.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF THE EMBODIMENTS

Figure 1:
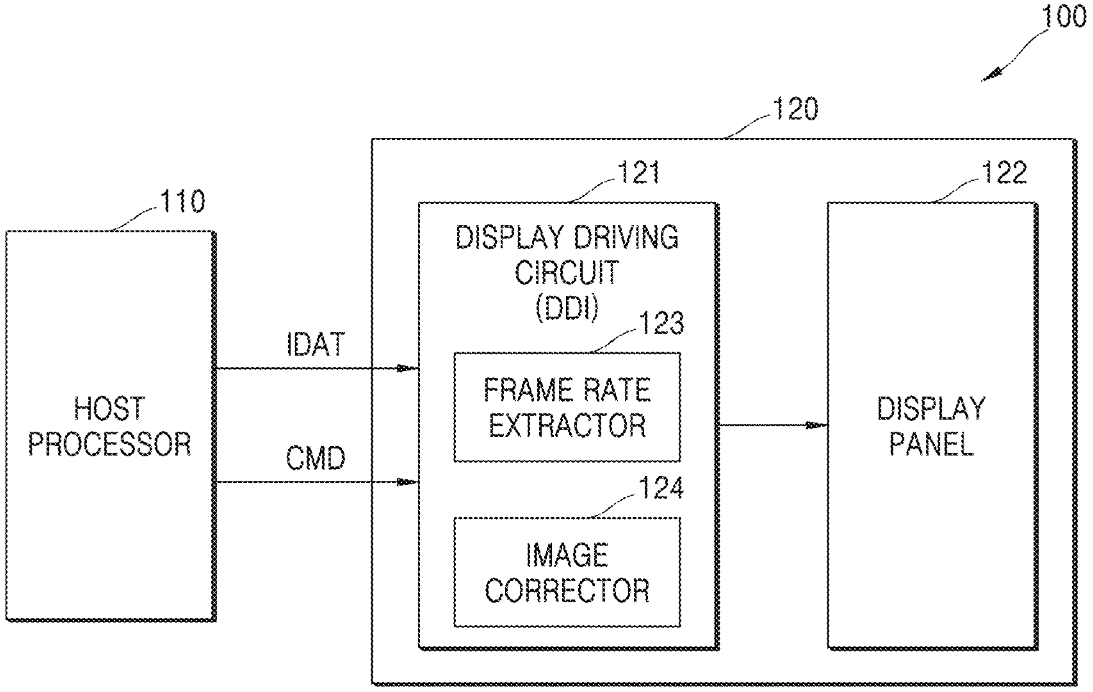
FIG. 1 is a block diagram of a display device and a display system including the same, according to some example embodiments of the inventive concepts.

Hereinafter, example embodiments of the inventive concepts will be described in detail with reference to the accompanying drawings. The example embodiments of the inventive concepts are provided to fully convey the scope of the inventive concepts to one of ordinary skill in the art. As the inventive concepts allows for various changes and numerous example embodiments, particular example embodiments will be illustrated in the drawings and described in detail. However, this is not intended to limit the inventive concepts to particular modes of practice, and it is to be appreciated that all changes, equivalents, and substitutes that do not depart from the spirit and technical scope of the inventive concepts are encompassed in the inventive concepts.

FIG. 1 is a block diagram of a display device 120 and a display system 100 including the same, according to some example embodiments of the inventive concepts.

The display system 100 according to some example embodiments of the inventive concepts may be equipped in an electronic device having an image display function. For example, the electronic device may include a smartphone, a tablet personal computer (PC), a portable multimedia player (PMP), a camera, a wearable device, a television, a digital video disk (DVD) player, a refrigerator, an air conditioner, an air purifier, a set-top box, a robot, a drone, various types of medical instruments, a navigation device, a global positioning system (GPS) receiver, a device for vehicles, furniture, various types of measuring instruments, or the like.

Referring to FIG. 1, the display system 100 may include the display device 120 and a host processor 110, and the display device 120 may include a display driving circuit (or a display driver integrated circuit) 121 and a display panel 122.

The host processor 110 may generate input image data IDAT to be displayed on the display panel 122, and transmit the input image data DAT and a control command CMD to the display driving circuit 121. For example, the control command CMD may include setting information about luminance, gamma, a frame frequency, an operating mode of the display driving circuit 121, and the like. The host processor 110 may transmit a clock signal, a synchronization signal, or the like to the display driving circuit 121.

The input image data DAT may include frame data corresponding to each frame. The host processor 110 may change a variable blank period of each frame, and may provide the input image data DAT to the display device 120 at a variable frame rate.

The host processor 110 may be a graphics processor. However, the inventive concepts are not limited thereto, and the host processor 110 may include various types of processors such as a central processing unit (CPU), a microprocessor, a multimedia processor, an application processor, and the like. In some example embodiments, the host processor 110 may be implemented as an integrated circuit (IC) or a system on chip (SoC).

The display device 120 may display the input image data IDAT received from the host processor 110. In some example embodiments, the display device 120 may be implemented by integrating the display driving circuit 121 and the display panel 122 into a single module. For example, the display driving circuit 121 may be mounted on a substrate of the display panel 122, or may be electrically connected to the display panel 122 through a connecting member such as a flexible printed circuit board (FPCB).

The display panel 122 may be a display unit for displaying an image, and may be a display device such as a thin-film-transistor liquid-crystal display (TFT-LCD), an organic light-emitting diode (OLED) display, a field-emission display, a plasma display panel (PDP), or the like, which receives an electrically transmitted image signal and displays a two-dimensional image.

The display driving circuit 121 may convert the input image data IDAT received from the host processor 110 into a plurality of analog signals, e.g., a plurality of data voltages, for driving the display panel 122, and supply the plurality of analog signals to the display panel 122. Consequently, an image corresponding to the input image data IDAT may be displayed on the display panel 122. A vertical synchronization signal may refer to a signal that is equally generated at a preset (or, alternatively, desired) position before start of a data enable signal. The vertical synchronization signal may be a high-definition multimedia interface (HDMI) vertical synchronization signal, a frame rate conversion (FRC) vertical synchronization signal, or the like.

The display driving circuit 121 may include a frame rate extractor 123 and an image corrector 124. The frame rate extractor 123 may calculate a frame rate of each frame. According to some example embodiments, the frame rate extractor 123 may calculate a frame rate based on a vertical synchronization signal input to the display driving circuit 121. The frame rate extractor 123 may calculate the frame rate of each frame based on a time point at which a logic level of the vertical synchronization signal changes.

The image corrector 124 may correct the input image data IDAT, based on the frame rate extracted by the frame rate extractor 123. In detail, the image corrector 124 may perform, based on the frame rate, color correction and gamma correction on the frame data included in input image data. In some example embodiments, the image corrector 124 may perform color correction and gamma correction on the input image data IDAT by using a lookup table corresponding to the extracted frame rate, and generate output image data.

The image corrector 124 may correct the frame data of a frame subsequent to a k-th frame based on the frame rate of the k-th frame. The image corrector 124 may apply the lookup table corresponding to the frame rate of the k-th frame, to frame data received after reception of k-th frame data, and generate output image data.

Figure 2:
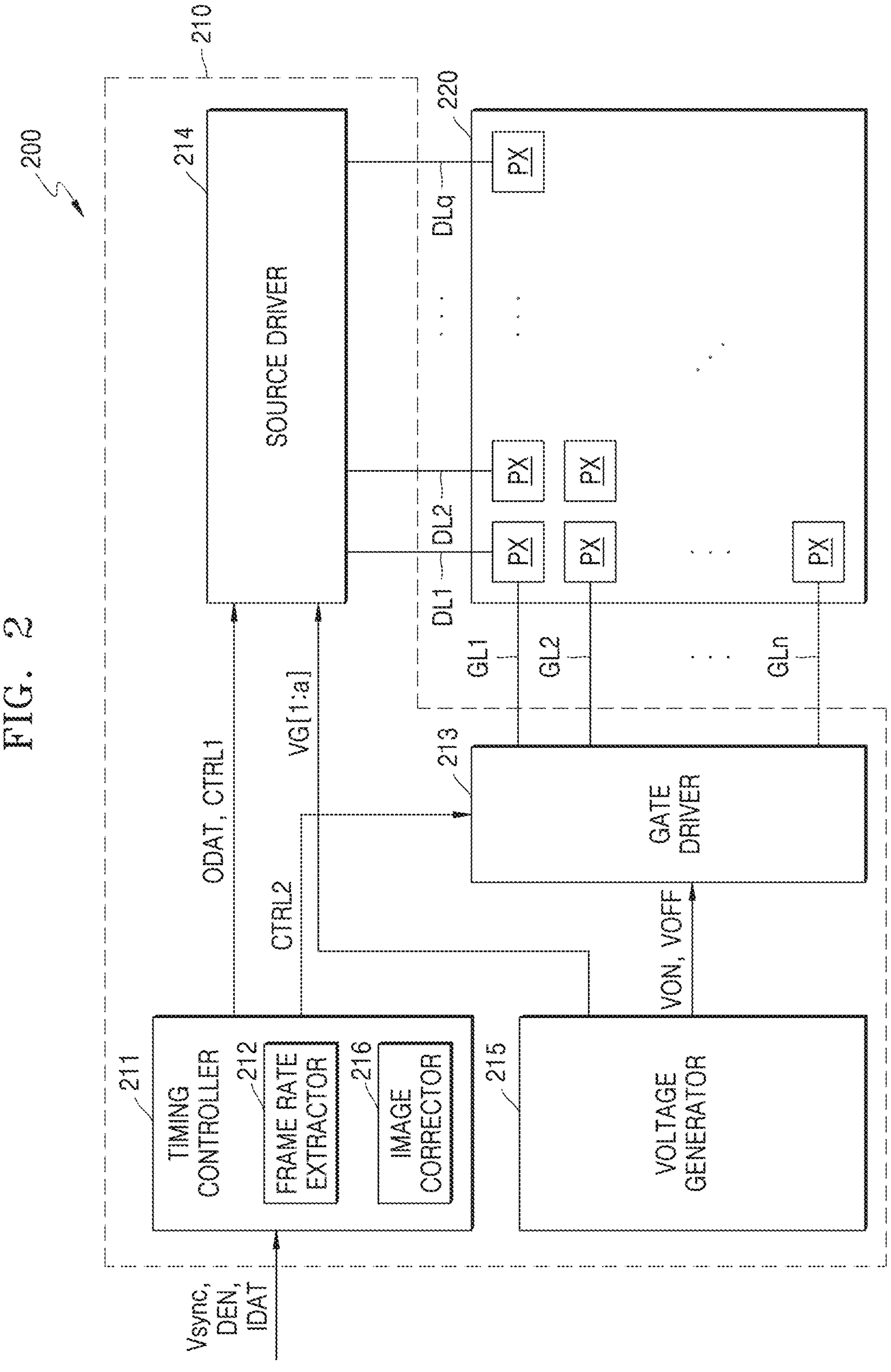
FIG. 2 is a block diagram of a display device according to some example embodiments of the inventive concepts.

FIG. 2 is a block diagram of a display device 200 according to some example embodiments of the inventive concepts.

Referring to FIG. 2, the display device 200 may include a display panel 220 for displaying an image, and a display driving circuit 210. The display driving circuit 210, the display panel 220, a frame rate extractor 212, and an image corrector 216 of FIG. 2 correspond to the display driving circuit 121, the display panel 122, the frame rate extractor 123, and the image corrector 124 of FIG. 1, respectively, and thus redundant descriptions thereof are omitted.

The display panel 220 may include a plurality of gate lines GL1 to GLn (hereinafter, also referred to as first to n-th gate lines GL1 to GLn), a plurality of data lines DL1 to DLq arranged to intersect with the plurality of gate lines GL1 to GLn, respectively, and a plurality of pixels PX arranged at intersections of the gate lines GL1 to GLn and the data lines DL1 to DLq, respectively.

For example, in the case where the display panel 220 is a TFT-LCD, each pixel PX may include a thin-film transistor having a gate electrode and a source electrode respectively connected to the respective gate line and data line, a liquid crystal capacitor connected to a drain electrode of the thin-film transistor, and a storage capacitor. When a certain gate line is selected from among the plurality of gate lines GL1 to GLn, the thin-film transistors of the pixels PX connected to the selected gate line may be turned on, and then data voltages may be applied to the plurality of data lines DL1 to DLq by a source driver 214. The data voltage may be applied to the liquid crystal capacitor and the storage capacitor through the thin-film transistor of the corresponding pixel PX, and the liquid crystal capacitor and the storage capacitor may be driven to display an image.

The display panel 220 includes a plurality of horizontal lines (or rows), and each horizontal line includes the pixels PX connected to one gate line. For example, the pixels PX in a first row connected to the first gate line GL1 may constitute a first horizontal line, and the pixels PX in a second row connected to the second gate line GL2 may constitute a second horizontal line.

During a horizontal line time, the pixels PX of one horizontal line may be driven, and during a next horizontal line time, the pixels PX of another horizontal line may be driven. For example, the pixels PX of the first horizontal line corresponding to the first gate line GL1 may be driven during a first horizontal line time, and thereafter, the pixels PX of the second horizontal line corresponding to the second gate line GL2 may be driven during a second horizontal line time. As described above, during the first to n-th horizontal line times, the pixels PX of the display panel 220 may be driven.

The display driving circuit 210 may include a timing controller 211, the source driver 214, a gate driver 213, and a voltage generator 215. The display driving circuit 210 may further include other general-purpose components, e.g., a clock generator, a memory, and the like.

The display driving circuit 210 may convert the input image data IDAT externally received into a plurality of analog signals, e.g., a plurality of data voltages, for driving the display panel 220, and supply the plurality of analog signals to the display panel 220.

The timing controller 211 may control the overall operation of the display driving circuit 210. For example, the timing controller 211 may control components of the display driving circuit 210, e.g., the source driver 214 and the gate driver 213, such that the input image data IDAT received from an external device is displayed on the display panel 220. The timing controller 211 may control an operation timing of the display driving circuit 210. The timing controller 211 may control operation timings of the source driver 214 and the gate driver 213 such that the input image data IDAT is displayed on the display panel 220.

The timing controller 211 may include the frame rate extractor 212 and the image corrector 216. The timing controller 211 may receive a vertical synchronization signal Vsync, a data enable signal DEN, and the input image data IDAT. The vertical synchronization signal Vsync, the data enable signal DEN, and the input image data IDAT may be provided from a host processor (e.g., the host processor 110 of FIG. 1). The input image data IDAT may include frame data corresponding to each of N frames. The k-th frame data may include information about the k-th frame. The data enable signal DEN may include an active period and a variable blank period of each of the N frames. The data enable signal DEN may indicate the start or end of the active period and the variable blank period. The vertical synchronization signal Vsync may indicate the start of one frame.

The timing controller 211 may receive the input image data IDAT from the host processor at a variable frame rate, and provide output image data ODAT to the source driver 214 in synchronization with the variable frame rate, thereby supporting a variable frame mode in which an image is displayed at the variable frame rate.

The frame rate extractor 212 may calculate a frame rate of each frame of the input image data IDAT, based on the vertical synchronization signal Vsync and the data enable signal DEN. The frame rate extractor 212 may calculate the frame rate of each frame of the input image data IDAT, based on a time point at which a logic level of the vertical synchronization signal Vsync changes. For example, the frame rate extractor 212 may calculate a frame rate of a first frame based on a time point at which the logic level of the vertical synchronization signal Vsync changes before the start of the active period of the first frame.

The image corrector 216 may perform color correction and gamma correction on the input image data IDAT, based on the frame rate extracted by the frame rate extractor 212. In some example embodiments, the image corrector 216 may perform color correction and gamma correction on the input image data IDAT by using a lookup table corresponding to the extracted frame rate, and generate output image data. The image corrector 216 may apply color data and gamma data included in the lookup table corresponding to the extracted frame rate, to frame data after the time point at which the frame rate is extracted, and generate the output image data.

For example, the frame rate extractor 212 may extract a frame rate of the first frame, and the image corrector 216 may select alookup table corresponding to the frame rate of the first frame. The image corrector 216 may apply the selected lookup table to second frame data corresponding to a second frame subsequent to the first frame, and perform color correction and gamma correction to output the second frame data as the output image data ODAT.

As illustrated in FIG. 2, the frame rate extractor 212 and the image corrector 216 may be included in the timing controller 211. However, the inventive concepts are not limited thereto, and the frame rate extractor 212 and the image corrector 216 may be implemented as control logic separate from the timing controller 211. Alternatively, at least one of the frame rate extractor 212 and the image corrector 216 may be included in the timing controller 211.

The frame rate extractor 212 and the image corrector 216 may be implemented as hardware or a combination of software (or firmware) and hardware. For example, the frame rate extractor 212 and the image corrector 216 may be implemented as a variety of hardware logic such as an application-specific integrated circuit (ASIC), a field-programmable gate array (FPGA), or a complex programmable logic device (CPLD), or may be implemented as firmware or software, which is executed by a processor such as a microcontroller unit (MCU) or a CPU, or a combination of a hardware device and software.

The timing controller 211 may generate the output image data ODAT having a format converted to meet an interface specification with the source driver 214, based on the received input image data IDAT, and output the output image data ODAT to the source driver 214. In addition, the timing controller 211 may generate various control signals CTRL1 and CTRL2 (hereinafter, also referred to as first and second control signals CTRL1 and CTRL2) for controlling timings of the source driver 214 and the gate driver 213. The timing controller 211 may output the first control signal CTRL1 to the source driver 214 and output the second control signal CTRL2 to the gate driver 213. Here, the first control signal CTRL1 may include a polarity control signal. In addition, the second control signal CTRL2 may include a gate timing signal.

The source driver 214 may be connected to the q data lines DL1 to DLq, and may output data voltages for driving the display panel 220 through the q data lines DL1 to DLq. The data voltages are signals provided to drive the pixels PX of one gate line of the display panel 220, and one frame may be implemented in the display panel 220 by outputting the data voltages to the q gate lines GL1 to GLq, respectively.

The source driver 214 may convert the output image data ODAT received from the timing controller 211 into a plurality of image signals, e.g., a plurality of data voltages, and output the plurality of data voltages to the display panel 220 through the plurality of data lines DL1 to DLq. The source driver 214 may receive the output image data ODAT in data units each corresponding to the plurality of pixels PX included in one horizontal line of the display panel 220.

The source driver 214 may receive the output image data ODAT for each horizontal line from the timing controller 211 and convert the output image data ODAT into data voltages, based on a plurality of gray voltages (or gamma voltages) VG[1:a] received from the voltage generator 215. The source driver 214 may output the plurality of data voltages to the display panel 220 in units of horizontal lines through the plurality of data lines DL1 to DLq.

The gate driver 213 may be connected to the plurality of gate lines GL1 to GLn of the display panel 220, and may sequentially drive the plurality of gate lines GL1 to GLn of the display panel 220. The gate driver 213 may sequentially provide a plurality of gate-on signals having an active level, e.g., a logic high level, to the plurality of gate lines GL1 to GLn under the control by the timing controller 211. Accordingly, the plurality of gate lines GL1 to GLn may be sequentially selected, and the plurality of data voltages may be applied to the pixels PX of the horizontal lines corresponding to the selected gate lines through the data lines DL1 to DLq.

The voltage generator 215 may generate various voltages required for driving the display device 200. For example, the voltage generator 215 may receive a power supply voltage from the outside. In addition, the voltage generator 215 may generate the plurality of gray voltages VG[1:a] and output the plurality of gray voltages VG[1:a] to the source driver 214. The voltage generator 215 may also generate a gate-on voltage VON and a gate-off voltage VOFF, and output the gate-on voltage VON and the gate-off voltage VOFF to the gate driver 213.

The display driving circuit 210 according to the inventive concepts may include additional components. For example, the display driving circuit 210 may further include a memory (not shown) for storing the input image data DAT for each frame. The memory may be referred to as graphics random-access memory (RAM), a frame buffer, or the like. The memory may include volatile memory such as dynamic RAM (DRAM) or static RAM (SRAM), or a nonvolatile memory such as read-only memory (ROM), flash memory, resistive RAM (ReRAM), and magnetoresistive RAM (MRAM).

In some example embodiments, the timing controller 211, the gate driver 213, the source driver 214, and the voltage generator 215 are illustrated as different functional blocks. In some example embodiments, the respective components may be implemented as different semiconductor chips. In another embodiment, at least two of the timing controller 211, the gate driver 213, the source driver 214, and the voltage generator 215 may be implemented as one semiconductor chip. For example, the source driver 214, the gate driver 213, and the voltage generator 215 may be integrated into one semiconductor chip. In addition, some components may be integrated into the display panel 220. For example, the gate driver 213 may be integrated into the display panel 220.

Figure 3:
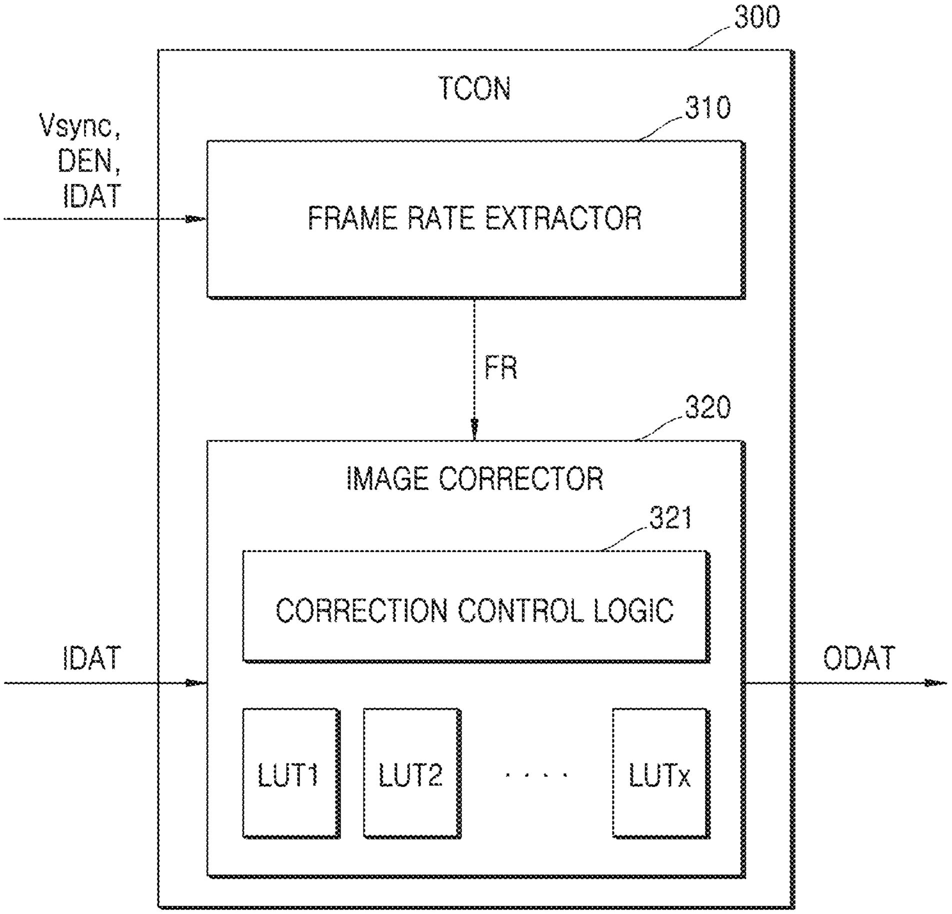
FIG. 3 is a block diagram of a timing controller according to some example embodiments of the inventive concepts.

FIG. 3 is a block diagram of a timing controller 300 according to some example embodiments of the inventive concepts.

Referring to FIG. 3, the timing controller 300 may include a frame rate extractor 310 and an image corrector 320. The timing controller 300, the frame rate extractor 310, and the image corrector 320 of FIG. 3 correspond to the timing controller 211, the frame rate extractor 212, and the image corrector 216 of FIG. 2, respectively, and thus redundant descriptions thereof are omitted. The image corrector 320 may include a correction control logic 321 and first to x-th lookup tables LUT1 to LUTx.

The frame rate extractor 310 may receive the vertical synchronization signal Vsync, the data enable signal DEN, and the input image data IDAT. The frame rate extractor 310 may extract a frame rate FR of a k-th frame, based on the vertical synchronization signal Vsync. The frame rate extractor 310 may extract the frame rate FR, based on a time point at which a logic level of the vertical synchronization signal Vsync changes. Hereinafter, a method of calculating an actual frame rate will be described in detail with reference to FIG. 4.

Figure 4:
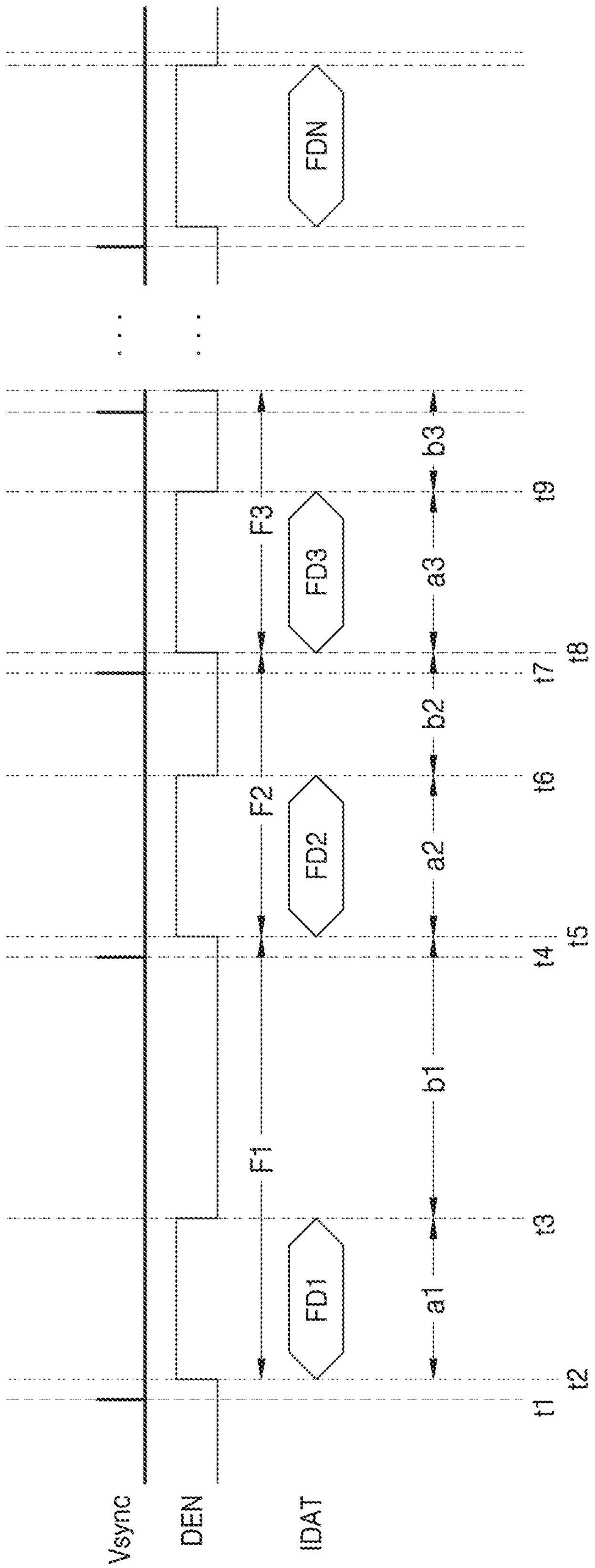
FIG. 4 is a diagram illustrating input of signals to a display driving circuit, according to some example embodiments of the inventive concepts.

FIG. 4 is a diagram illustrating input of signals to a display driving circuit, according to some example embodiments of the inventive concepts.

Referring to FIGS. 3 and 4, the input image data DAT may include frame data corresponding to each of N frames. The frame data may include information about the corresponding frame. For example, the input image data DAT may include first frame data FD1 corresponding to a first frame F1, second frame data FD2 corresponding to a second frame F2, and third frame data FD3 corresponding to a third frame F3. The first frame data FD1 may include information about the first frame F1, the second frame data FD2 may include information about the second frame F2, and the third frame data FD3 may include information about the third frame F3.

Each frame may include an active period having a preset (or, alternatively, desired) time period, and a variable blank period having a variable time period corresponding to the frame rate. That is, the k-th frame may include the active period and the variable blank period. The variable blank period may occur after the active period. For example, the first frame F1 may include a first active period a1 and a first variable blank period b1. The second frame F2 may include a second active period a2 and a second variable blank period b2. The lengths of the active periods of the frames may be equal to each other. The lengths of the variable blank periods of the frames may be different from each other. For example, the lengths of the first active period a1 and the second active period a2 may be equal to each other. The lengths of the first variable blank period b1 and the second variable blank period b2 may be different from each other.

The data enable signal DEN may indicate the active period and the variable blank period of the k-th frame. The data enable signal DEN may indicate the active period and the variable blank period according to the frame data. The data enable signal DEN may have different logic levels in the active period and the variable blank period. For example, the data enable signal DEN may have a logic high level during the active period, and may have a logic low level during the variable blank period. However, the data enable signal DEN is not limited thereto, and may have a logic low level during the active period and a logic high level during the variable blank period.

At the start time point of the active period of each frame, the logic level of the data enable signal DEN may change from a logic low level to a logic high level. At the end time point of the active period and the start time point of the variable blank period of each frame, the logic level of the data enable signal DEN may change from a logic high level to a logic low level. For example, at a second time point t2, which is the start time point of the first active period a1 of the first frame F1, the logic level of the data enable signal DEN may change from a logic low level to a logic high level. At a third time point t3, which is the start time point of the first variable blank period b1 of the first frame F1, the logic level of the data enable signal DEN may change from a logic high level to a logic low level.

The data enable signal DEN may indicate the period of the k-th frame. A period between time points at the logic level of the data enable signal DEN changes in the same pattern may correspond to the k-th frame. A period between time points at which the logic level of the data enable signal DEN changes from a logic low level to a logic high level may correspond to one frame. For example, a period between the second time point t2 and a fifth time point t5 at which the logic level of the data enable signal DEN changes from a logic low level to a logic high level may correspond to the first frame F1. A period between the fifth time point t5 and an eighth time point t8 may correspond to the second frame F2.

The vertical synchronization signal Vsync may indicate the start of the k-th frame. Before receiving the data enable signal DEN with respect to the k-th frame, the vertical synchronization signal Vsync with respect to the k-th frame may be received. The vertical synchronization signal Vsync may be received before the start time point of the active period of the k-th frame. For example, the vertical synchronization signal Vsync may be received at the first time point t1, which is prior to the second time point t2, which is the start time point of the active period a1 of the first frame F1. The vertical synchronization signal Vsync may be received at a fourth time point t4, which is prior to the fifth time point t5, which is the start time point of the active period a2 of the second frame F2. The vertical synchronization signal Vsync may be received at a seventh time point t7, which is prior to the eighth time point t8, which is the start time point of an active period a3 of the third frame F3.

Because the logic level of the vertical synchronization signal Vsync changes before the start of the active period of the k-th frame, the vertical synchronization signal Vsync may indicate the start of the k-th frame. For example, because the logic level of the vertical synchronization signal Vsync changes at the first time point t1, which is prior to the second time point t2, which is the start time point of the active period a1 of the first frame F1, the vertical synchronization signal Vsync may indicate the start of the first frame F1. The vertical synchronization signal Vsync may refer to a signal, the logic level of which changes for a short time period before the logic level of the data enable signal DEN changes in the variable blank period. The time intervals between the time points at which the logic level of the vertical synchronization signal Vsync changes and the start time points of the active periods a1, a2, and a3 in the frames, respectively, may be equal to each other. For example, the lengths of the period between the first time point t1 and the second time point t2 and the period between the fourth time point t4 and the fifth time point t5 may be equal to each other. The lengths of the period between the fourth time point t4 and the fifth time point t5 and the period between the seventh time point t7 and the eighth time point t8 may be equal to each other. Hereinafter, FIGS. 3 and 4 will be referred together.

Referring to FIGS. 3 and 4, the frame rate extractor 310 may extract the frame rate FR of the k-th frame, based on the vertical synchronization signal Vsync. The frame rate extractor 310 may extract the frame rate FR of the k-th frame, based on an extraction time point at which the logic level of the vertical synchronization signal Vsync changes before the start time point of the active period. That is, the frame rate extractor 310 may extract the frame rate FR of the k-th frame, based on the extraction time point, which is closest to the start time point of the active period of the k-th frame among the time points at which the logic level of the vertical synchronization signal Vsync changes before the start time point of the active period of the k-th frame. For example, the frame rate extractor 310 may extract the frame rate FR of the first frame F1, based on the first time point t1, which is an extraction time point. The frame rate extractor 310 may extract the frame rate FR of the second frame F2, based on the fourth time point t4, which is an extraction time point.

The frame rate extractor 310 may extract the frame rate FR when a preset (or, alternatively, desired) time period has elapsed from the extraction time point. The frame rate extractor 310 may extract the frame rate FR of the k-th frame, based on an extraction time point at which the logic level of the vertical synchronization signal Vsync changes from a logic low level to a logic high level. For example, the frame rate extractor 310 may extract the frame rate FR of the first frame F1 after a preset (or, alternatively, desired) time period has elapsed from the first time point t1, which is the extraction time point. The frame rate extractor 310 may extract the frame rate FR of the second frame F2 after a preset (or, alternatively, desired) time period has elapsed from the fourth time point t4, which is the extraction time point.

An extraction time point corresponding to the k-th frame may be a k-th extraction time point. The first time point t1 may correspond to a first extraction time point, the fourth time point t4 may correspond to a second extraction time point, and the seventh time point t7 may correspond to a third extraction time point.

The frame rate extractor 310 may calculate an actual frame rate of the k-th frame. The frame rate FR may include an actual frame rate and a virtual frame rate. The frame rate extractor 310 may calculate an actual frame rate of the k-th frame, based on extraction time points of the k-th frame and a (k+1)th frame subsequent to the k-th frame. The (k+1)th frame may refer to a frame subsequent to the k-th frame. The frame rate extractor 310 may calculate the actual frame rate of the k-th frame, based on the k-th extraction time point and a (k+1)th extraction time point. For example, the frame rate extractor 310 may calculate an actual frame rate of the first frame F1, based on the first extraction time point and the second extraction time point. The frame rate extractor 310 may calculate the actual frame rate of the first frame F1, based on the number of internal clock signals generated by the timing controller 300 during a time period between the first time point t1, which is the first extraction time point, and the fourth time point t4, which is the second extraction time point. As another example, the frame rate extractor 310 may calculate an actual frame rate of the second frame F2, based on the fourth time point t4, which is the second extraction time point, and the seventh time point t7, which is the third extraction time point. Because the actual frame rate of the k-th frame is calculated by using the k-th extraction time point and the (k+1)th extraction time point, the actual frame rate of the k-th frame may be calculated after the (k+1)th extraction time point.

The frame rate extractor 310 may extract the frame rate FR of the (k+1)th frame to be equal to one of the actual frame rate of the (k+1)th frame and a virtual frame rate of the (k+1)th frame. The frame rate extractor 310 may calculate a virtual frame rate in a different manner from that in which the actual frame rate is calculated. The frame rate extractor 310 may extract the frame rate FR of the (k+1)th frame to be equal to one of the actual frame rate of the (k+1)th frame and the virtual frame rate of the (k+1)th frame, based on a difference between the actual frame rate of the k-th frame and the actual frame rate of the (k+1)th frame.

In some example embodiments, the frame rate extractor 310 may extract the frame rate FR of the (k+1)th frame to be equal to a virtual frame rate when the difference between the actual frame rate of the k-th frame and the actual frame rate of the (k+1)th frame is greater than or equal to a preset (or, alternatively, desired) value. For example, in the case where the preset (or, alternatively, desired) value is 60 Hz, the k-th frame is the first frame F1, the actual frame rate of the first frame F1 is 60 Hz, and the actual frame rate of the second frame F2 is 120 Hz, the frame rate extractor 310 may extract the frame rate of the second frame F2 to be equal to a virtual frame rate. The virtual frame rate will be described below with reference to FIGS. 5A to 6B.

In some example embodiments, the frame rate extractor 310 may extract the frame rate FR of the (k+1)th frame to be equal to the actual frame rate of the (k+1)th frame when the difference between the actual frame rate of the k-th frame and the actual frame rate of the (k+1)th frame is less than the preset (or, alternatively, desired) value. For example, in the case where the preset (or, alternatively, desired) value is 30 Hz, the k-th frame is the first frame F1, the actual frame rate of the first frame F1 is about or exactly 60 Hz, and the actual frame rate of the second frame F2 is about or exactly 80 Hz, the frame rate extractor 310 may extract the frame rate FR of the second frame F2 to be about or exactly 80 Hz.

The image corrector 320 may include the correction control logic 321 and the first to x-th lookup tables LUT1 to LUTx. The image corrector 320 may correct frame data received after reception of the k-th frame data based on the frame rate FR of the k-th frame, and output the corrected frame data as image data.

The image corrector 320 may correct (k+1)th frame data, based on the frame rate of the k-th frame, and output the corrected (k+1)th frame data as the output image data ODAT. The (k+1)th frame data may be received after reception of the k-th frame data. For example, the image corrector 320 may correct the second frame data FD2, based on the frame rate of the first frame F1.

The frame rate of the k-th frame may be extracted after the k-th extraction time point. The frame rate of the k-th frame may be extracted before the start time point of the active period of the (k+1)th frame, and the (k+1)th frame data may be corrected, based on the frame rate of the k-th frame.

The first to x-th lookup tables LUT1 to LUTx may store gamma data and color data corresponding to different frame rates, respectively. For example, the first lookup table LUT1 may store gamma data and color data corresponding to 60 Hz, and the second lookup table LUT2 may store gamma data and color data corresponding to 100 Hz.

The correction control logic 321 may determine whether there is a lookup table corresponding to the frame rate of the k-th frame among the first to x-th lookup tables LUT1 to LUTx. The correction control logic 321 may receive the frame rate FR from the frame rate extractor 310. The correction control logic 321 may correct the (k+1)th frame data, based on a lookup table corresponding to the frame rate FR of the k-th frame. The correction control logic 321 may perform gamma correction and color correction on the (k+1)th frame data by applying the gamma data and the color data included in the lookup table.

Figure 5A:
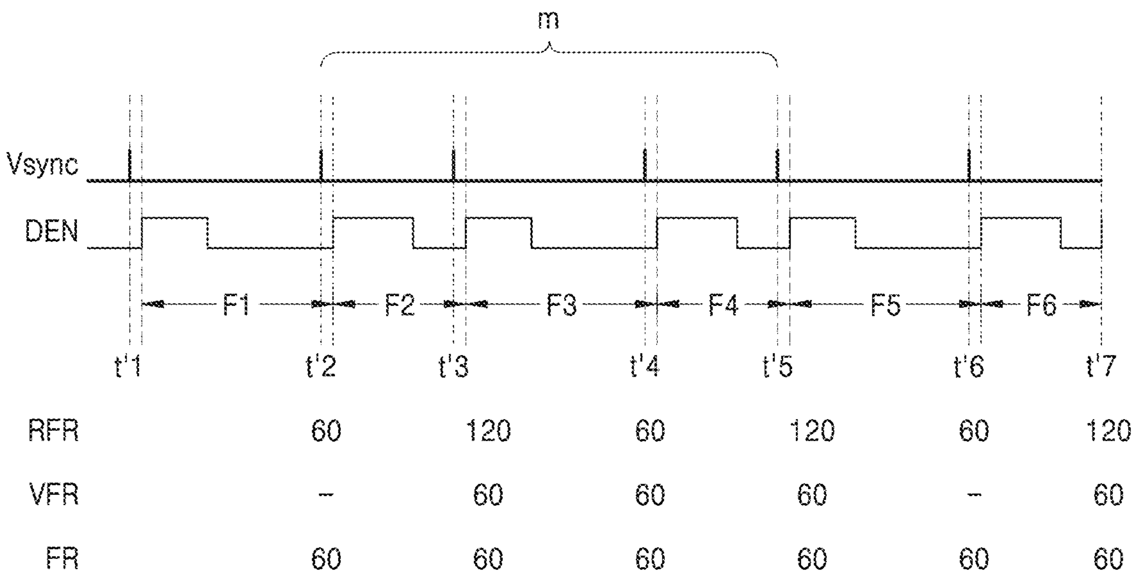
FIGS. 5A and 5B are diagrams illustrating a method of extracting virtual frame rates, according to some example embodiments of the inventive concepts.

FIG. 5A is a diagram illustrating a method of extracting virtual frame rates, according to some example embodiments of the inventive concepts. Descriptions that are already provided above are omitted.

Referring to FIGS. 3 and 5A, the frame rate extractor 310 may calculate an actual frame rate RFR, based on extraction time points. The frame rate extractor 310 may calculate the actual frame rate RFR of the first frame F1 to be 60 Hz, based on a first extraction time point t'1 and a second extraction time point t'2. The frame rate extractor 310 may calculate the actual frame rate RFR of the second frame F2 to be 120 Hz, based on the second extraction time point t'2 and a third extraction time point t'3. The frame rate extractor 310 may calculate the actual frame rate RFR of the third frame F3 to be 60 Hz, based on the third extraction time point t'3 and a fourth extraction time point t'4. In the same manner, the actual frame rate RFR of a fourth frame F4 may be calculated to be 120 Hz, the actual frame rate RFR of a fifth frame F5 may be calculated to be 60 Hz, and the actual frame rate RFR of a sixth frame F6 may be calculated to be 120 Hz. The actual frame rate RFR of a frame may be calculated in a time period between the extraction time point of the subsequent frame and the start time point of the active period of the subsequent frame. For example, the actual frame rate RFR of the first frame F1 may be calculated in a time period between the second extraction time point t'2 and the start time point of the active period of the second frame F2. When the difference between the actual frame rate RFR of the k-th frame and the actual frame rate RFR of the (k+1)th frame is greater than or equal to a preset (or, alternatively, desired) value, the frame rate extractor 310 may extract the frame rates of the (k+1)th frame to a (k+m)th frame as virtual frame rates VFR of the (k+1)th frame to the (k+m)th frame, respectively. Here, m is an integer greater than or equal to 1, and may be preset (or, alternatively, desired). That is, when the difference is greater than or equal to the preset (or, alternatively, desired) value, the frame rates of the k-th frame to the (k+m)th frame may be extracted to be equal to the virtual frame rates VFR. The frame rate extractor 310 may extract the frame rate of the k-th frame to be equal to the actual frame rate RFR of the k-th frame. The virtual frame rate VFR and the frame rate RF of a frame may be extracted in a time period between the extraction time point of the subsequent frame and the start time point of the active period of the subsequent frame.

The frame rate extractor 310 may calculate the virtual frame rate VFR of each of the (k+1)th frame to the (k+m)th frame to be equal to the actual frame rate RFR of the k-th frame.

It is assumed that the preset (or, alternatively, desired) value is 60 Hz, the k-th frame is the first frame F1, and m is 3. Because the difference between the actual frame rate RFR of the first frame F1 and the actual frame rate RFR of the second frame F2 is 60 Hz, the frame rate extractor 310 may extract the frame rate of the first frame F1 to be equal to the actual frame rate RFR of the first frame F1, e.g., 60 Hz. The frame rate extractor 310 may calculate the virtual frame rates VFR of the second frame F2, the third frame F3, and the fourth frame F4 to be 60 Hz.

The frame rate extractor 310 may extract the frame rate of the second frame F2 to be 60 Hz, which is the virtual frame rate VFR of the second frame F2. The frame rate extractor 310 may extract the frame rate of the third frame F3 to be 60 Hz, which is the virtual frame rate VFR of the third frame F3. The frame rate extractor 310 may extract the frame rate of the fourth frame F4 to be 60 Hz, which is the virtual frame rate VFR of the fourth frame F4.

Next, because the difference between the actual frame rate RFR of the fifth frame F5 and the actual frame rate RFR of the sixth frame F6 is 60 Hz, the frame rate extractor 310 may extract the frame rate FR of the fifth frame F5 to be 60 Hz, which is the actual frame rate RFR of the fifth frame F5, and extract the frame rate of the sixth frame F6 to be 60 Hz, which is the virtual frame rate VFR of the sixth frame F6.

Figure 5B:
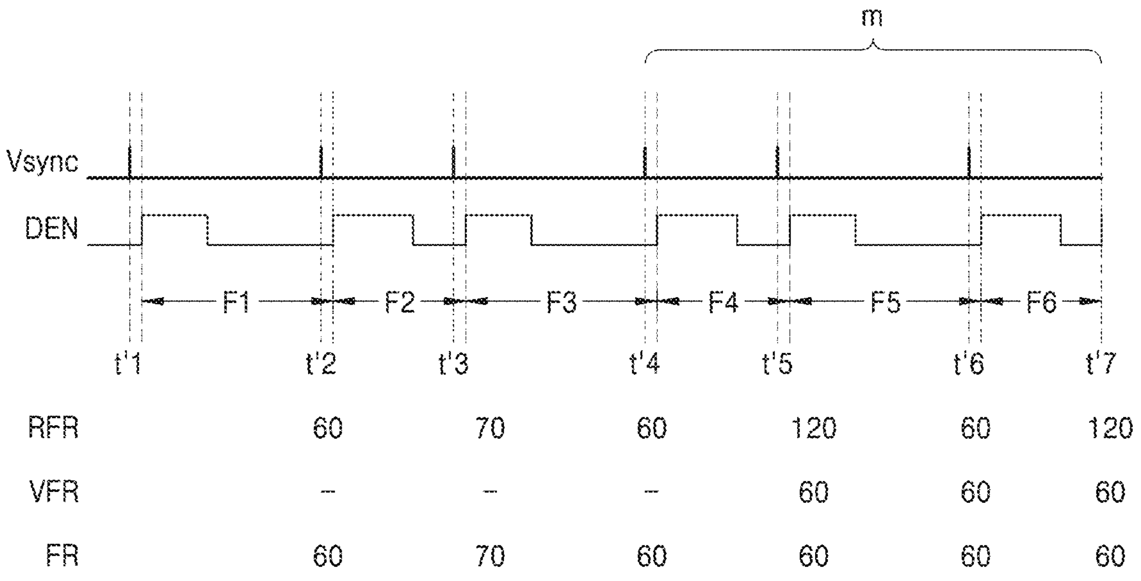

FIG. 5B is a diagram illustrating a method of extracting virtual frame rates, according to some example embodiments of the inventive concepts. Descriptions that are already provided above with reference to FIG. 5A are omitted.

Referring to FIGS. 3 and 5B, the frame rate extractor 310 may calculate the actual frame rate RFR of the second frame F2 to be 70 Hz, based on the second extraction time point t'2 and the third extraction time point t'3.

When the difference between the actual frame rate RFR of the k-th frame and the actual frame rate RFR of the (k+1)th frame is less than a preset (or, alternatively, desired) value, the frame rate extractor 310 may extract the frame rate of the (k+1)th frame to be equal to the actual frame rate of the (k+1)th frame.

It is assumed that the preset (or, alternatively, desired) value is 60 Hz and m is 3. Because the difference between the actual frame rate RFR of the first frame F1 and the actual frame rate RFR of the second frame F2 is 10 Hz, the frame rate extractor 310 may extract the frame rate of the first frame F1 to be equal to the actual frame rate RFR of the first frame F1, e.g., 60 Hz, and extract the frame rate of the second frame F2 to be equal to the actual frame rate RFR of the second frame F2, e.g., 70 Hz.

Because the difference between the actual frame rate RFR of the second frame F2 and the actual frame rate RFR of the third frame F3 is 10 Hz, the frame rate extractor 310 may extract the frame rate of the third frame F3 to be 60 Hz, which is the actual frame rate RFR of the third frame F3.

Because the difference between the actual frame rate RFR of the third frame F3 and the actual frame rate RFR of the fourth frame F4 is 60 Hz, the frame rate extractor 310 may extract the frame rate of the third frame F3 to be equal to the actual frame rate RFR of the third frame F3, e.g., 60 Hz, and extract the frame rate of the fourth frame F4 to be 60 Hz, which is the virtual frame rate VFR of the fourth frame F4.

The frame rate extractor 310 may extract the frame rate of the fifth frame F5 to be 60 Hz, which is the virtual frame rate VFR of the fifth frame F5. The frame rate extractor 310 may extract the frame rate of the sixth frame F6 to be 60 Hz, which is the virtual frame rate VFR of the sixth frame F6. Because the frame rate of the k-th frame is maintained for up to the (k+m)th frame, the frame rate of each frame may not rapidly change, and flicker may be prevented about or exactly.

Figure 6A:
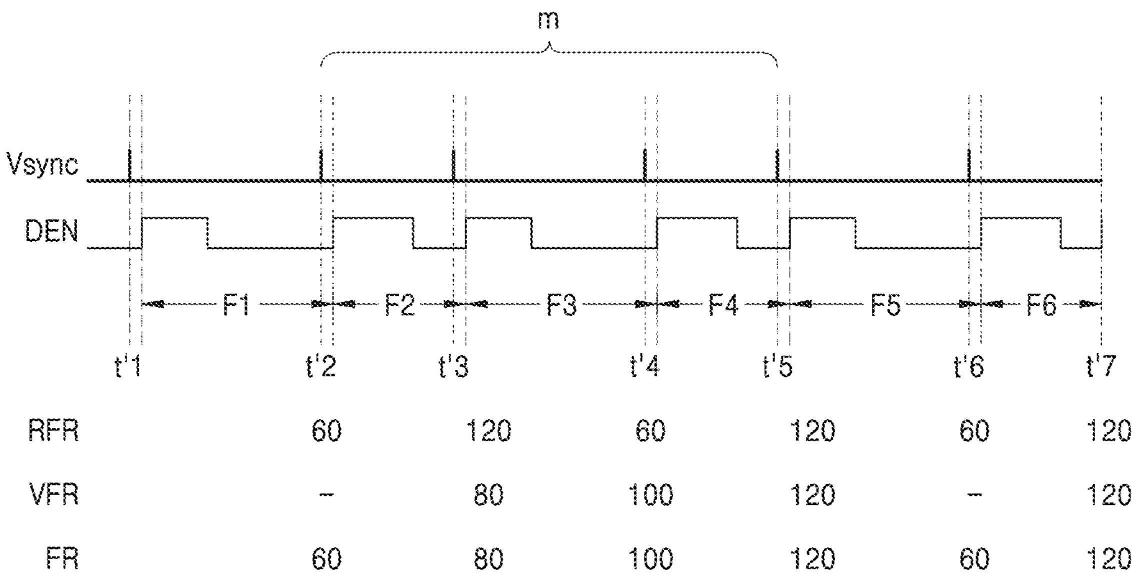
FIGS. 6A and 6B are diagrams illustrating a method of extracting virtual frame rates, according to another embodiment of the inventive concepts.

FIG. 6A is a diagram illustrating a method of extracting virtual frame rates, according to another embodiment of the inventive concepts. Descriptions that are already provided above are omitted.

Referring to FIGS. 3 and 6A, the frame rate extractor 310 may calculate the actual frame rate RFR of the first frame F1 to be 60 Hz, based on the first extraction time point t'1 and the second extraction time point t'2. The frame rate extractor 310 may calculate the actual frame rate RFR of the second frame F2 to be 120 Hz, based on the second extraction time point t'2 and a third extraction time point t'3. The frame rate extractor 310 may calculate the actual frame rate RFR of the third frame F3 to be 60 Hz, based on the third extraction time point t'3 and a fourth extraction time point t'4. In the same manner, the actual frame rate RFR of the fourth frame F4 may be calculated to be 120 Hz, the actual frame rate RFR of the fifth frame F5 may be calculated to be 60 Hz, and the actual frame rate RFR of the sixth frame F6 may be calculated to be 120 Hz.

When the difference between the actual frame rate RFR of the k-th frame and the actual frame rate RFR of the (k+1)th frame is greater than or equal to a preset (or, alternatively, desired) value, the frame rate extractor 310 may extract the frame rates of the (k+1)th frame to a (k+m)th frame to be equal to virtual frame rates VFR of the (k+1)th frame to the (k+m)th frame, respectively.

The frame rate extractor 310 may calculate the virtual frame rate VFR of each of the (k+1)th frame to the (k+m)th frame to be equal to one of the actual frame rate RFR of the k-th frame, the actual frame rate RFR of the (k+1)th frame, and a value between the actual frame rate RFR of the k-th frame and an actual frame rate RFR of the (k+1)th frame. For example, the virtual frame rate VRF of the second frame F2 may be a value between the actual frame rate RFR of the first frame F1 and the actual frame rate RFR of the second frame F2.

The virtual frame rates VFR of the (k+1)th frame to the (k+m)th frame may be different from each other. In some example embodiments, the virtual frame rates VFR of the (k+1)th frame to the (k+m)th frame may gradually increase. For example, the virtual frame rate VFR of the second frame F2 may be less than the virtual frame rate VFR of the third frame F3, and the virtual frame rate VFR of the third frame F3 may be less than the virtual frame rate VFR of the fourth frame F4.

It is assumed that the preset (or, alternatively, desired) value is 60 Hz and m is 3. Because the difference between the actual frame rate RFR of the first frame F1 and the actual frame rate RFR of the second frame F2 is 60 Hz, the frame rate extractor 310 may extract the frame rate of the first frame F1 to be equal to the actual frame rate RFR of the first frame F1, e.g., 60 Hz.

The frame rate extractor 310 may calculate the virtual frame rate VFR of the second frame F2 to be 80 Hz, which is a value between 60 Hz and 120 Hz. The frame rate extractor 310 may calculate the virtual frame rate VFR of the third frame F3 to be 100 Hz, which is a value between 60 Hz and 120 Hz. The frame rate extractor 310 may calculate the virtual frame rate VFR of the fourth frame F4 to be 120 Hz, which is the actual frame rate RFR of the second frame F2.

The frame rate extractor 310 may extract the frame rate of the second frame F2 to be 80 Hz, which is the virtual frame rate VFR of the second frame F2. The frame rate extractor 310 may extract the frame rate of the third frame F3 to be 100 Hz, which is the virtual frame rate VFR of the third frame F3. The frame rate extractor 310 may extract the frame rate of the fourth frame F4 to be 120 Hz, which is the virtual frame rate VFR of the fourth frame F4.

Next, because the difference between the actual frame rate RFR of the fifth frame F5 and the actual frame rate RFR of the sixth frame F6 is 60 Hz, the frame rate extractor 310 may extract the frame rate of the fifth frame F5 to be 60 Hz, which is the actual frame rate RFR of the fifth frame F5, and extract the frame rate of the sixth frame F6 to be 120 Hz, which is the virtual frame rate VFR of the sixth frame F6.

Figure 6B:
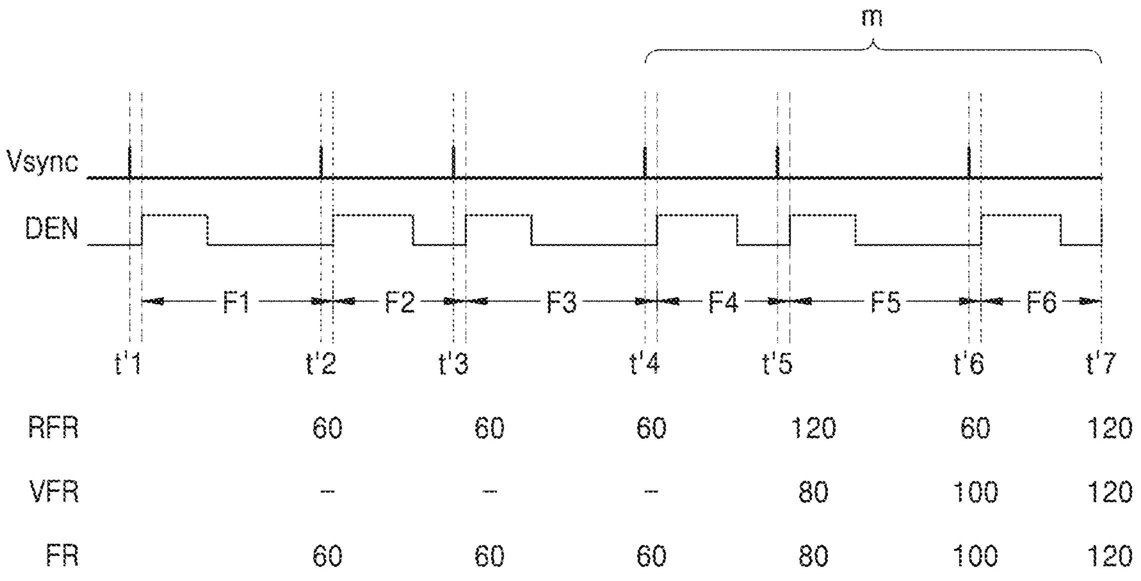

FIG. 6B is a diagram illustrating a method of extracting virtual frame rates, according to another embodiment of the inventive concepts. Descriptions that are already provided above with reference to FIG. 6A are omitted.

Referring to FIGS. 3 and 6B, the frame rate extractor 310 may calculate the actual frame rate RFR of the second frame F2 to be 60 Hz, based on the second extraction time point t'2 and the third extraction time point t'3.

When the difference between the actual frame rate RFR of the k-th frame and the actual frame rate RFR of the (k+1)th frame is less than a preset (or, alternatively, desired) value, the frame rate extractor 310 may extract the frame rate of the (k+1)th frame to be equal to the actual frame rate of the (k+1)th frame.

It is assumed that the preset (or, alternatively, desired) value is 60 Hz and m is 3. Because the difference between the actual frame rate RFR of the first frame F1 and the actual frame rate RFR of the second frame F2 is 0 Hz, the frame rate extractor 310 may extract the frame rate of the first frame F1 to be equal to the actual frame rate RFR of the first frame F1, e.g., 60 Hz, and extract the frame rate of the second frame F2 to be equal to the actual frame rate RFR of the second frame F2, e.g., 60 Hz.

Because the difference between the actual frame rate RFR of the second frame F2 and the actual frame rate RFR of the third frame F3 is 0 Hz, the frame rate extractor 310 may extract the frame rate of the third frame F3 to be 60 Hz, which is the actual frame rate RFR of the third frame F3.

Because the difference between the actual frame rate RFR of the third frame F3 and the actual frame rate RFR of the fourth frame F4 is 60 Hz, the frame rate extractor 310 may extract the frame rate of the fourth frame F4 to be 80 Hz, which is the virtual frame rate VFR of the fourth frame F4.

The frame rate extractor 310 may extract the frame rate of the fifth frame F5 to be 100 Hz, which is the virtual frame rate VFR of the fifth frame F5. The frame rate extractor 310 may extract the frame rate of the sixth frame F6 to be 120 Hz, which is the virtual frame rate VFR of the sixth frame F6.

Figure 7:
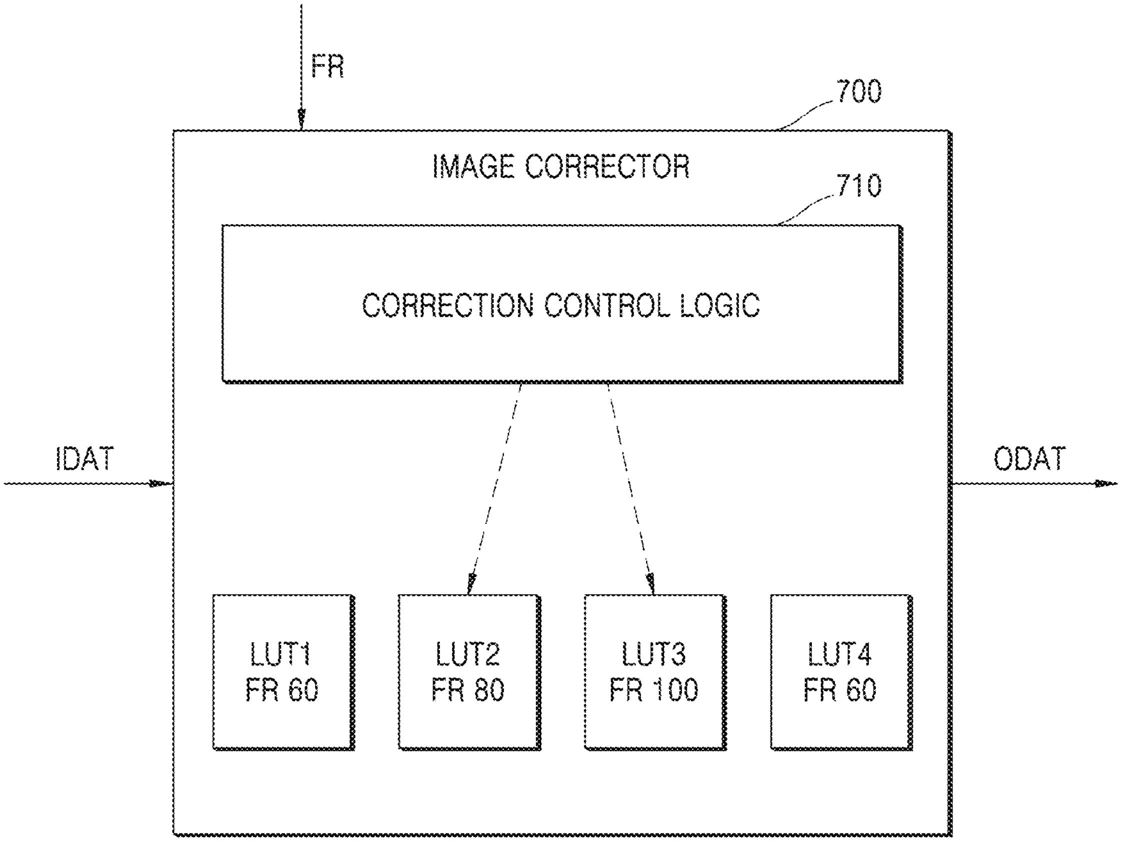
FIG. 7 is a block diagram of an image corrector according to some example embodiments of the inventive concepts.

FIG. 7 is a block diagram of an image corrector 700 according to some example embodiments of the inventive concepts.

Referring to FIG. 7, the image corrector 700 may include a correction control logic 710, a first lookup table LUT1, a second lookup table LUT2, a third lookup table LUT3, and a fourth lookup table LUT4. The first lookup table LUT1 may store gamma data and color data corresponding to 60 Hz. The second lookup table LUT2 may store gamma data and color data corresponding to 80 Hz. The third lookup table LUT3 may store gamma data and color data corresponding to 100 Hz. The fourth lookup table LUT4 may store gamma data and color data corresponding to 120 Hz. Descriptions that are already provided above are omitted. Although FIG. 7 illustrates that the image corrector 700 includes four lookup tables, the number of lookup tables is not limited thereto and may vary according to some example embodiments.

The correction control logic 710 may correct the input image data IDAT and output the corrected input image data IDAT as the output image data ODAT. The correction control logic 710 may perform gamma correction and color correction on frame data included in the input image data IDAT. The correction control logic 710 may receive the frame rate FR of the k-th frame from a frame rate extractor (e.g., the frame rate extractor 310 of FIG. 3), and select a lookup table corresponding to the received frame rate FR. The correction control logic 710 may correct the (k+1)th frame data by using the selected lookup table.

The correction control logic 710 may determine whether there is a lookup table corresponding to the frame rate FR of the k-th frame among a plurality of lookup tables. The correction control logic 710 may determine whether there is a lookup table corresponding to the frame rate FR of the k-th frame among the first to fourth lookup tables LUT1, LUT2, LUT3, and LUT4.

When there is a lookup table corresponding to the frame rate FR of the k-th frame among the plurality of lookup tables, the correction control logic 710 may correct the (k+1)th frame data, based on the lookup table corresponding to the frame rate FR of the k-th frame. For example, assuming that the frame rate FR of a second frame is 60 Hz, the correction control logic 710 may determine that there is a lookup table corresponding to the frame rate FR of the second frame. The correction control logic 710 may correct second frame data based on the first lookup table LUT1. As another example, assuming that the frame rate FR of a fourth frame is 120 Hz, the correction control logic 710 may determine that there is a fourth lookup table LUT4 corresponding to 120 Hz. The correction control logic 710 may correct fifth frame data based on the fourth lookup table LUT4.

When there is no lookup table corresponding to the frame rate FR of the k-th frame among the plurality of lookup tables, the correction control logic 710 may generate a lookup table corresponding to the frame rate FR of the k-th frame by using the plurality of lookup tables.

When there is no lookup table corresponding to the frame rate FR of the k-th frame in the plurality of lookup tables, the correction control logic 710 may correct the (k+1)th frame data based on the generated lookup table. For example, assuming that the frame rate FR of a third frame is 90 Hz, the correction control logic 710 may determine that there is no lookup table corresponding to the frame rate FR of the third frame. The correction control logic 710 may generate a lookup table corresponding to 90 Hz by using the second lookup table LUT2 and the third lookup table LUT3. Hereinafter, a method of generating a lookup table will be described with reference to FIGS. 7 and 8.

Figure 8:
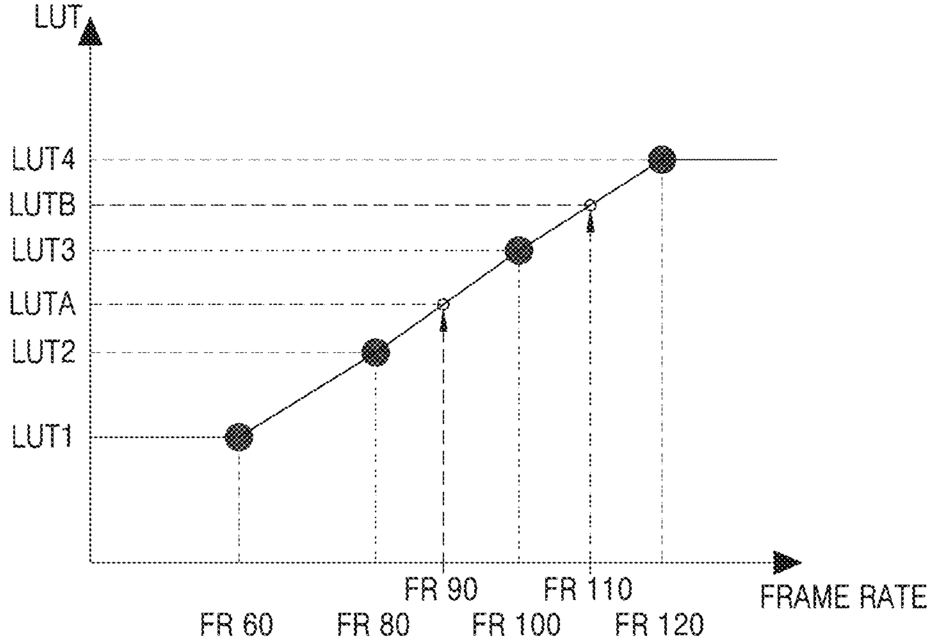
FIG. 8 is a diagram illustrating a method of generating a lookup table, according to some example embodiments of the inventive concepts.

FIG. 8 is a diagram illustrating a method of generating a lookup table, according to some example embodiments of the inventive concepts.

Referring to FIGS. 7 and 8, when there is no lookup table corresponding to the frame rate FR of the k-th frame in the plurality of lookup tables, the correction control logic 710 may generate a lookup table corresponding to the frame rate FR of the k-th frame by using interpolation. Linear interpolation and nonlinear interpolation may be used.

The correction control logic 710 may generate a lookup table corresponding to the frame rate FR of the k-th frame, based on a lookup table corresponding to the highest frame rate FR among lookup tables each corresponding to a frame rate less than the frame rate FR of the k-th frame and a lookup table corresponding to the lowest frame rate FR among lookup tables each corresponding to a frame rate greater than the frame rate FR of the k-th frame. The generated lookup table may be stored in the image corrector 700.

When the frame rate FR of the k-th frame is 90 Hz, lookup tables each corresponding to a frame rate less than 90 Hz include the first lookup table LUT1 and the second lookup table LUT2. A lookup table corresponding to the highest frame rate FR among the first lookup table LUT1 and the second lookup table LUT2 is the second lookup table LUT2. Lookup tables each corresponding to a frame rate greater than 90 Hz are the third lookup table LUT3 and the fourth lookup table LUT4. Among the third lookup table LUT3 and the fourth lookup table LUT4, the third lookup table LUT3 corresponds to the lowest frame rate FR. The correction control logic 710 may generate a lookup table LUTA corresponding to 90 Hz, based on the second lookup table LUT2 and the third lookup table LUT3. The lookup table LUTA corresponding to 90 Hz may be calculated by Equation 1.

$$LUTA=\{LUT2*(FR\ 90-FR\ 80)+LUT3*(FR\ 100-FR\ 90)\}/(FR\ 100-FR\ 80) \quad \text{[Equation 1]}$$

The correction control logic 710 may correct the (k+1)th frame data by using the lookup table LUTA corresponding to 90 Hz.

When the frame rate FR of the k-th frame is 110 Hz, lookup tables each corresponding to a frame rate less than 110 Hz are the first lookup table LUT1, the second lookup table LUT2, and the third lookup table LUT3. A lookup table corresponding to the highest frame rate FR among the first lookup table LUT1, the second lookup table LUT2, and the third lookup table LUT3 is the third lookup table LUT3. Only the fourth lookup table LUT4 corresponds to a frame rate greater than 110 Hz. The correction control logic 710 may generate a lookup table LUTB corresponding to 110 Hz, based on the third lookup table LUT3 and the fourth lookup table LUT4. The lookup table LUTB corresponding to 110 Hz may be calculated by Equation 2.

$$LUTB=\{LUT3*(FR\ 110-FR\ 100)+LUT4*(FR\ 120-FR\ 110)\}/(FR\ 120-FR\ 100) \quad \text{[Equation 2]}$$

The correction control logic 710 may correct the (k+1)th frame data by using the lookup table LUTB corresponding to 110 Hz.

Figure 9:
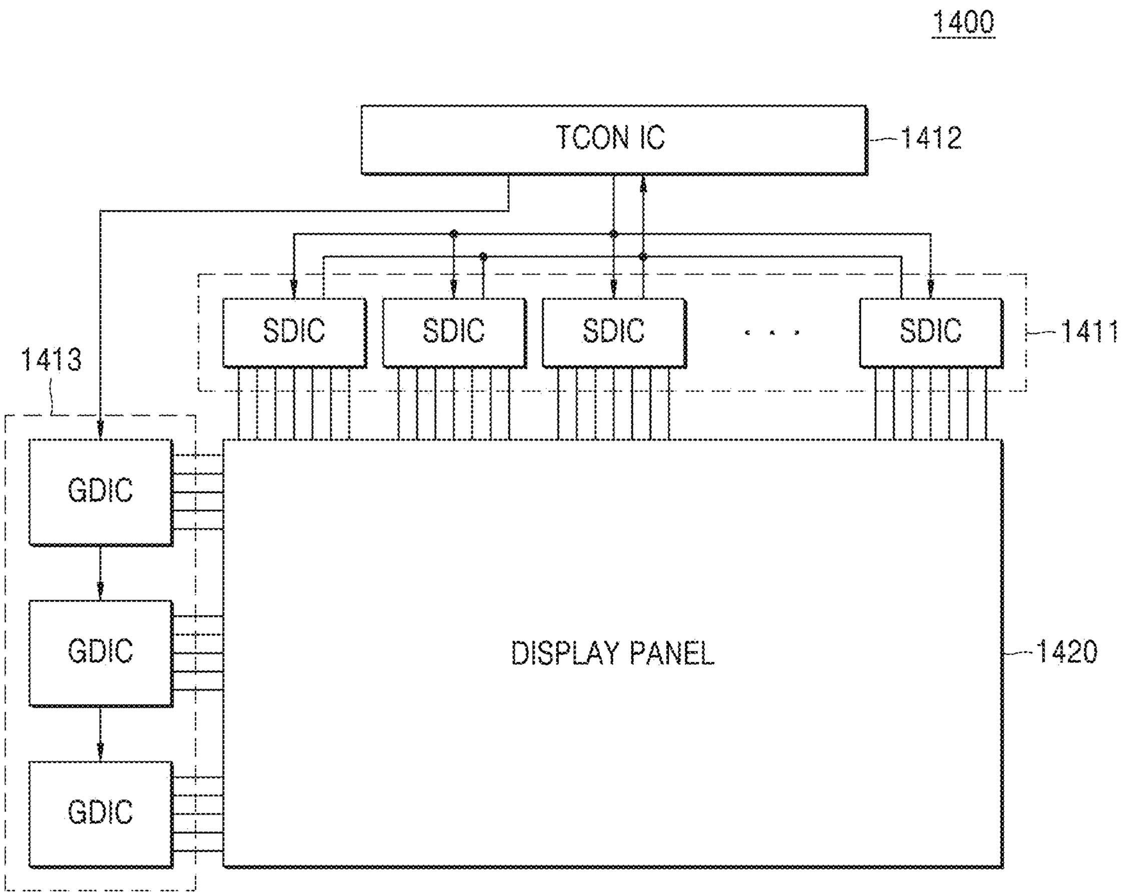
FIG. 9 is a diagram illustrating an example of a display device according to some example embodiments of the inventive concepts.

FIG. 9 is a diagram illustrating an example of a display device 1400 according to some example embodiments of the inventive concepts. The display device 1400 of FIG. 9 includes a display panel 1420, which is medium or large in size, and may be applied to, for example, a television and a monitor.

Referring to FIG. 9, the display device 1400 may include a source driver 1411, a timing controller 1412, a gate driver 1413, and the display panel 1420.

The timing controller 1412 may include one or more integrated circuits (ICs) or modules. The timing controller 1412 may communicate with a plurality of source driver ICs SDIC and a plurality of gate driver ICs GDIC through a preset (or, alternatively, desired) interface.

The timing controller 1412 may generate control signals for controlling driving timings of the plurality of source driver ICs SDIC and the plurality of gate driver ICs GDIC, and provide the control signals to the plurality of source driver ICs SDIC and the plurality of gate driver ICs GDIC.

The source driver 1411 may include the plurality of source driver ICs SDIC, which may be mounted on a circuit film such as a tap carrier package (TCP), a chip on film (COF), or a flexible printed circuit (FPC), and attached to the display panel 1420 in a tape automatic bonding (TAB) manner, or may be mounted on the non-display region of the display panel 1420 in a chip on glass (COG) manner.

The gate driver 1413 may include the plurality of gate driver ICs GDIC, which may be mounted on a circuit film and attached to the display panel 1420 in a TAB manner, or may be mounted on the non-display region of the display panel 1420 in a COG manner. Alternatively, the gate driver 1413 may be directly formed on a lower substrate of the display panel 1420 in a gate-driver in panel (GIP) manner. The gate driver 1413 may be formed in a non-display region outside a pixel array in which pixels are formed in the display panel 1420 in the same TFT process in which the pixels are formed.

As described above with reference to FIGS. 1 to 9, the timing controller 1412 may extract a frame rate of each frame of input image data based on a vertical synchronization signal received before the start time point of the active period of each frame. The timing controller 1412 may calculate the frame rate of each frame of the input image data IDAT, based on a time point at which the logic level of the vertical synchronization signal changes. The timing controller 1412 may perform color correction and gamma correction on the input image data based on the frame rate. The timing controller 1412 may apply color data and gamma data included in the lookup table corresponding to the extracted frame rate, to frame data after the time point at which the frame rate is extracted, and generate output image data. Because the frame rate may be extracted based on the vertical synchronization signal, a delay between the frame from which the frame rate is extracted and the frame to which the lookup table corresponding to the extracted frame rate is applied may be reduced. Accordingly, flicker and deterioration in the image quality of a display may be prevented or reduced.

Figure 10:
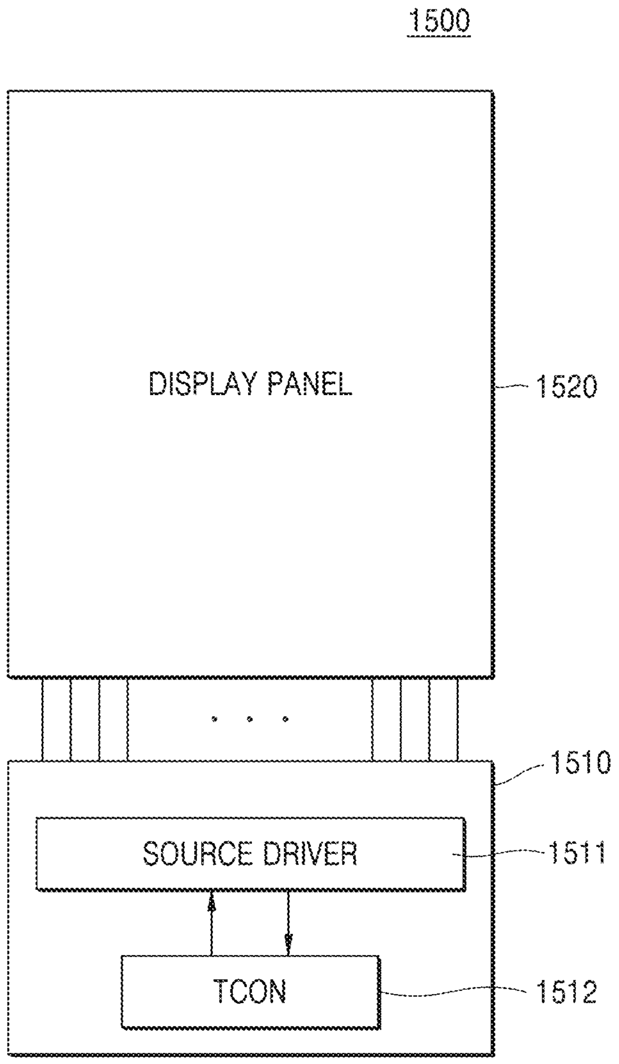
FIG. 10 is a diagram illustrating a display device according to some example embodiments of the inventive concepts.

FIG. 10 is a diagram illustrating an example of a display device 1500 according to some example embodiments of the inventive concepts. The display device 1500 of FIG. 10 includes a display panel 1520, which is small in size, and may be applied to, for example, a mobile device such as a smartphone or a tablet PC. A timing controller 1512 may include a frame rate extractor (e.g., the frame rate extractor 212 of FIG. 2) and an image corrector (e.g., the image corrector 216 of FIG. 2). The timing controller 1512 may correspond to the timing controllers described above, and thus redundant descriptions thereof are omitted.

Referring to FIG. 10, the display device 1500 may include a display driving circuit 1510 and the display panel 1520. The display driving circuit 1510 may include one or more ICs, and may be mounted on a circuit film such as a TCP, a COF, or an FPC and attached to the display panel 1520 in a TAB manner, or may be mounted on a non-display region (e.g., a region where an image is not displayed) of the display panel 1520 in a COG manner.

The display driving circuit 1510 may include a source driver 1511 and the timing controller 1512, and may further include a gate driver. In some example embodiments, the gate driver may be mounted on the display panel 1520.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

The display system 100 (or other circuitry, for example, the host processor 110, display device 120, display driving circuit 121, frame rate extractor 123, image corrector 123, timing controller 211, voltage generator 215, gate driver 213, source driver 214, correction control logic 321, display device 1400, display device 1500, display driving circuit 1510, source driver 1511, TCON 1512, or other circuitry discussed herein) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to some example embodiments thereof, it will be understood that various changes in form and details may be made therein without departing from the spirit and scope of the following claims.

What is claimed is:

1. A display driving circuit comprising:

a frame rate extractor configured to receive a vertical synchronization signal indicating a start of a k-th frame, k-th frame data including information about the k-th frame, and a data enable signal indicating an active period of the k-th frame and a variable blank period that occurs after the active period, and extract a frame rate of the k-th frame, based on the vertical synchronization signal; and an image corrector configured to correct frame data for a (k+1)th frame received after reception of the k-th frame data, based on the frame rate of the k-th frame, and output the corrected frame data as output image data, wherein the vertical synchronization signal is received before a start time point of the active period.

2. The display driving circuit of claim 1, wherein the frame rate extractor is further configured to extract the frame rate of the k-th frame, based on an extraction time point at which a logic level of the vertical synchronization signal changes before the start time point of the active period.

3. The display driving circuit of claim 2, wherein the frame rate extractor is further configured to calculate an actual frame rate of the k-th frame, based on a k-th extraction time point corresponding to the k-th frame and a (k+1)th extraction time point corresponding to the (k+1)th frame.

4. The display driving circuit of claim 3, wherein the frame rate extractor is further configured to extract, based on a difference between the actual frame rate of the k-th frame and an actual frame rate of the (k+1)th frame, a frame rate of the (k+1)th frame to be equal to one of the actual frame rate of the (k+1)th frame and a virtual frame rate calculated in a different manner from a manner in which the actual frame rate of the (k+1)th frame is calculated.

5. The display driving circuit of claim 4, wherein the frame rate extractor is further configured to extract, when the difference is greater than or equal to a value, frame rates of the (k+1)th frame to a (k+m)th frame (m is an integer greater than or equal to 1) to be equal to virtual frame rates of the (k+1)th frame to the (k+m)th frame, respectively.

6. The display driving circuit of claim 5, wherein the frame rate extractor is further configured to calculate the virtual frame rates of the (k+1)th frame to the (k+m)th frame to be equal to the actual frame rate of the k-th frame.

7. The display driving circuit of claim 5, wherein the frame rate extractor is further configured to calculate the virtual frame rates of the (k+1)th frame to the (k+m)th frame to be equal to one of the actual frame rate of the k-th frame, the actual frame rate of the (k+1)th frame, and a value between the actual frame rate of the k-th frame and the actual frame rate of the (k+1)th frame.

8. The display driving circuit of claim 7, wherein the virtual frame rates of the (k+1)th frame to the (k+m)th frame are different from each other.

9. The display driving circuit of claim 3, wherein the frame rate extractor is further configured to extract the frame rate of the k-th frame to be equal to the actual frame rate of the k-th frame.

10. The display driving circuit of claim 4, wherein the frame rate extractor is further configured to extract, when the difference is less than a value, the frame rate of the (k+1)th frame to be equal to the actual frame rate of the (k+1)th frame.

11. The display driving circuit of claim 1, wherein the image corrector is further configured to correct, based on the frame rate of the k-th frame, (k+1)th frame data including information about the (k+1)th frame.

12. The display driving circuit of claim 11, wherein the image corrector is configured to store gamma data and color data corresponding to different frame rates in a plurality of lookup tables; and the image correcting comprising a correction control logic configured to determine an existence of a lookup table corresponding to the frame rate of the k-th frame in the plurality of lookup tables.

13. The display driving circuit of claim 12, wherein the correction control logic is further configured to, based on the lookup table corresponding to the frame rate of the k-th frame being in the plurality of lookup tables, correct the (k+1)th frame data, based on the lookup table corresponding to the frame rate of the k-th frame.

14. A display driving circuit comprising:

a frame rate extractor configured to receive a vertical synchronization signal indicating a start of each of N frames, input image data including frame data corresponding to each of the N frames, and a data enable signal indicating an active period and a variable blank period of each of the N frames, and extract a frame rate of a k-th frame (k is an integer greater than or equal to 1 and less than or equal to N); and an image corrector configured to correct, based on the frame rate of the k-th frame, (k+1)th frame data corresponding to a (k+1)th frame.

15. The display driving circuit of claim 14, wherein the image corrector is configured to store gamma data and color data corresponding to different frame rates in a plurality of lookup tables; and the image correcting comprising a correction control logic configured to determine whether there is a lookup table corresponding to the frame rate of the k-th frame extracted by the frame rate extractor among the plurality of lookup tables.

16. The display driving circuit of claim 15, wherein the correction control logic is further configured to, based on the lookup table corresponding to the frame rate of the k-th frame being in the plurality of lookup tables, correct the (k+1)th frame data based on the lookup table corresponding to the frame rate of the k-th frame.

17. The display driving circuit of claim 15, wherein the correction control logic is further configured to, based on the lookup table corresponding to the frame rate of the k-th frame being not in the plurality of lookup tables, generate the lookup table corresponding to the frame rate of the k-th frame by using interpolation based on the plurality of lookup tables.

18. The display driving circuit of claim 14, wherein the frame rate extractor is further configured to calculate an actual frame rate of the k-th frame, based on an extraction time point, which is closest to a start time point of an active period of the k-th frame among time points at which a logic level of the vertical synchronization signal changes before the start time point of the active period of the k-th frame.

19. The display driving circuit of claim 18, wherein the frame rate extractor is further configured to extract, based on a difference between the actual frame rate of the k-th frame and an actual frame rate of the (k+1)th frame, a frame rate of the (k+1)th frame to be equal to one of the actual frame rate of the (k+1)th frame and a virtual frame rate calculated in a different manner from a manner in which the actual frame rate of the (k+1)th frame is calculated.

20. A display device comprising:

a display panel;

a display driving circuit configured to drive the display panel such that an image is displayed on the display panel;

a frame rate extractor configured to receive a vertical synchronization signal indicating a start of a k-th frame, k-th frame data including information about the k-th frame, and a data enable signal indicating an active period of the k-th frame and a variable blank period that occurs after the active period, and extract a frame rate of the k-th frame, based on the vertical synchronization signal; and an image corrector configured to correct frame data for a (k+1)th frame received after reception of the k-th frame data, based on the frame rate of the k-th frame, and output the corrected frame data as output image data, wherein the vertical synchronization signal is received before a start time point of the active period.

* * * * *